United States Patent
Luwang et al.

(10) Patent No.: US 10,618,819 B2
(45) Date of Patent: Apr. 14, 2020

(54) PARA-AMINOBENZOIC ACID SENSITIZED TERBIUM DOPED LAF$_3$ NANOPARTICLES FOR DETECTION OF EXPLOSIVE NITRO COMPOUNDS

(71) Applicant: Council of Scientific & Industrial Research, New Delhi (IN)

(72) Inventors: Meitram Niraj Luwang, Pune (IN); Debasish Ghosh, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 481 days.

(21) Appl. No.: 15/502,158

(22) PCT Filed: Aug. 6, 2015

(86) PCT No.: PCT/IN2015/050082
§ 371 (c)(1),
(2) Date: Feb. 6, 2017

(87) PCT Pub. No.: WO2016/020939
PCT Pub. Date: Feb. 11, 2016

(65) Prior Publication Data
US 2017/0225963 A1    Aug. 10, 2017

(30) Foreign Application Priority Data
Aug. 6, 2014   (IN) ............... 2228/DEL/2014

(51) Int. Cl.
C01F 17/00 (2020.01)
G01N 21/77 (2006.01)
G01N 21/64 (2006.01)
C01F 17/265 (2020.01)
(Continued)

(52) U.S. Cl.
CPC ........... C01F 17/265 (2020.01); G01N 21/64 (2013.01); G01N 31/227 (2013.01); B82Y 15/00 (2013.01); G01N 31/221 (2013.01); G01N 2021/7786 (2013.01)

(58) Field of Classification Search
CPC ........ G01N 2021/7786; G01N 2021/64; C01F 17/0062
See application file for complete search history.

(56) References Cited

U.S. PATENT DOCUMENTS

2007/0218009 A1* 9/2007 van Veggel .......... A61K 41/009
424/9.34

OTHER PUBLICATIONS

Ghosh et al., "p-Aminobenzoic acid (pABA) sensitization of LaF$_3$:Tb$^{3+}$ nanoparticles and its applications in the detection of explosive materials", RSC Advances: An International Journal to Further the Chemical Sciences, Jan. 7, 2015, vol. 5, No. 14, pp. 10468-10478.
(Continued)

Primary Examiner — Matthew E. Hoban
Assistant Examiner — Lynne Edmondson
(74) Attorney, Agent, or Firm — Blank Rome LLP

(57) ABSTRACT

The patent relates to para amino benzoic acid (pABA) sensitized terbium (Tb$^{3+}$) doped spherical LaF$_3$ nanoparticles used for detection of nitro group containing compounds using the terbium (Tb$^{3+}$) doped spherical LaF$_3$ nanoparticles sensitized by para amino benzoic acid (pABA).

7 Claims, 9 Drawing Sheets

(51) Int. Cl.
  G01N 31/22 (2006.01)
  B82Y 15/00 (2011.01)

(56) References Cited

OTHER PUBLICATIONS

Li et al., "Enhanced Emission of Ultra-small-sized $LaF_3:RE^{3+}$ (RE=Eu, Tb) nanoparticles through 1, 2, 4, 5-benzenetetracarboxylic acid sensitization", Nanoscale, The Royal Society of Chemistry, www.rsc.org/nanoscale; vol. 4, No. 18, Jan. 1, 2012, pp. 5619-5626.

Ma, et al., "Multifunctional Inorganic-organic Hybrid Nanospheres for Rapid and Selective Luminescence Detection of TNT in Mixed Nitroaromatics via Magnetic Separation", Talanta, www.elsevier.com/locate/talanta, vol. 116, Jul. 20, 2013, pp. 535-540.

Kukuoz, et al., "Color Kinetic Nanoparticles", Journal of American Chemical Society, vol. 130, 2008, pp. 12222-12223.

J. M. Lezhnina et al., "Rare-earth Ions in Porous Matrices", Proceedings of the XII Feofilov Workshop "Spectroscopy of Crystals Activated by Rare-Earth and Transition-Metal Ions", Physics of the Solid State, vol. 47, No. 8, 2005, pp. 1479-1484.

Liu et al., "X-ray Luminescence of La F3 :Tb3 + and La F 3 : cE 3 + Water-soluble Nanoparticles", Journal of Applied Physics, vol. 102, 2008, pp. 1-8.

Wang, et al., "Energy Transfer from Benzoic Acid to Lanthanide Ions in Benzoic Acid-functionalized Lanthanide-doped $CaF_2$ Nanoparticies", Applied Surface Science, www.elsevier.com/locate/apsusc, vol. 257 , 2011, pp. 7145-7149.

Yao et al., "Formation and Luminescence Phenomena of $LaF_3:Ce^{3+}$ Nanoparticles and Lanthanide-Organic Compounds in Dimethyl Sulfoxide", Journal of Phys. Chem. C, American Chemical Society, vol. 114, 2010, pp. 826-831.

Hong et al., Inkjet Printing Lanthanide Doped Nanorods Test Paper for Visual Assays of Nitroaromatic Explosives, Analytica Chimica Acta, www.elsevier.com/locate/aca, vol. 802, 2013, pp. 89-94.

V. Pankratov, et al., "LaPO4:Ce, Tb and YVO4: Eu Nanophosphors: Luminescence Studies in the Vacuum Ultraviolet Spectral Range", Journal of Applied Physics, vol. 110, 2011, pp. 1-8.

Mukherjee, et al., "Lanthanide Sensitization in II-VI Semiconductor Materials: A Case Study with Terbium (III) and Europium (III) in Zinc Sulfide Nanopartides", J. Phys. Chem. A, Apr. 28, 2011, vol. 115, No. 16, pp. 4031-4041.

Mondejar et al., "Lanthanide-doped Calcium Phosphate Nanoparticles with High Internal Crystallanity and with a Shell of DNA as Fluorescent Probes in Cell Experiments", Journal of Materials Chemistry, www.rsc.org/materials, vol. 17, 2007, pp. 4153-4159.

Lescop, et al., "Ligand-Centered Near-Infrared Luminescence from Lanthanide Complexes with Chelating Nitronyl Nitroxide Free Radicals", Inorg. Chem., American Chemical Society, vol. 39, 2000, pp. 3740-3741.

Zhang et al., "A Strategy to Protect and Sensitize Near-Infrared Luminescent $Nd^{3+}$ and $Yb^{3+}$ :Organic Tropolonate Ligands for the Sensitization of $Ln^{3+-}$ Doped $NaYF_4$ Nanocrystals", University of Nebraska—Lincoln, DigitalCommons@UniveristyofNebraska-Lincoln, Department of Chemistry, Journal of the American Chemical Society, 2007, vol. 129, No. 48, pp. 14834-14835.

Menzel, et al., "Trace Explosives Detection by Photoluminescence", The Scientific World Journal, vol. 4, 2004, pp. 55-66.

International Preliminary Report for PCT/IN2015/050082, dated Jul. 21, 2016, 6 pages.

International Search Report and Written Opinion for PCT/IN2015/050082, dated Dec. 17, 2015, 13 pages.

* cited by examiner

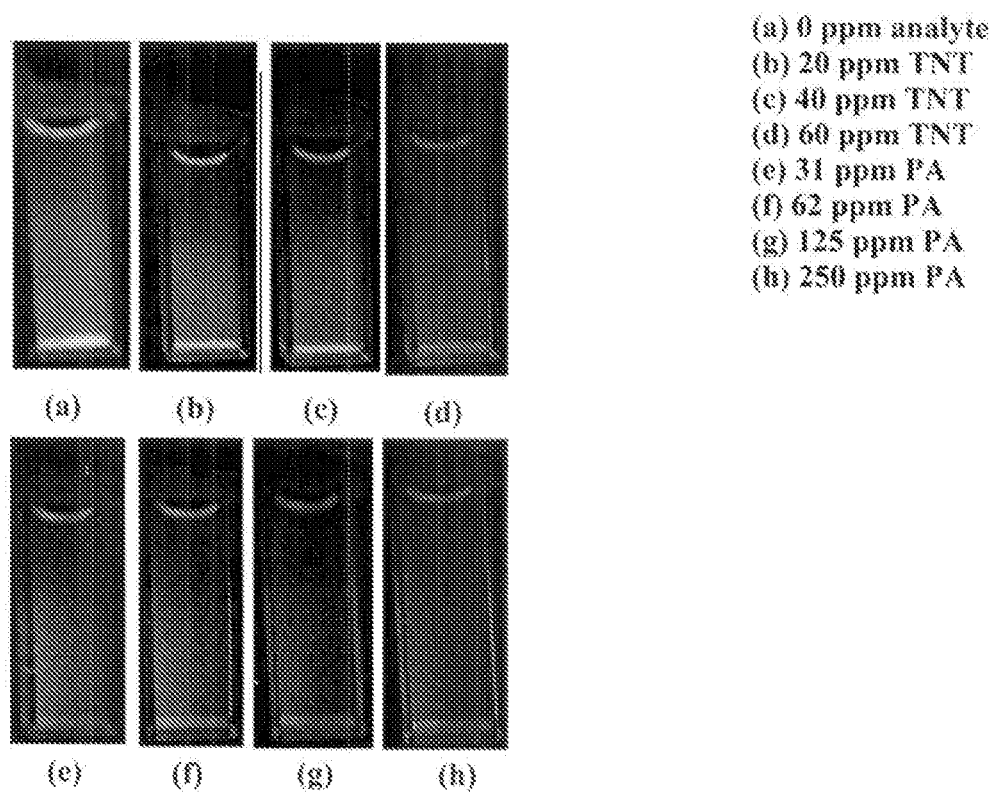
(a) 0 ppm analyte
(b) 20 ppm TNT
(c) 40 ppm TNT
(d) 60 ppm TNT
(e) 31 ppm PA
(f) 62 ppm PA
(g) 125 ppm PA
(h) 250 ppm PA
Fig: 15 pARA-AMINOBENZOIC ACID SENSITIZED
TERBIUM DOPED LaF$_3$ NANOPARTICLES
FOR DETECTION OF EXPLOSIVE NITRO
COMPOUNDS

RELATED APPLICATIONS

This application is a national phase of PCT/IN20151050082, filed on Aug. 6, 2015, which claims the benefit of Indian Patent Application No. 2228/DEL112014, filed on Aug. 6, 2014. The contents of those applications are hereby incorporated by reference.

FIELD OF THE INVENTION

The present invention relates to the para amino benzoic acid (pABA) sensitized terbium (Tb$^{3+}$) doped spherical LaF$_3$ nanoparticles for detection of nitro compounds. Particularly, present invention relates to a method for the detection of highly explosive nitro compounds using the terbium (Tb$^{3+}$) doped spherical LaF$_3$ nanoparticles sensitized by para amino benzoic acid (pABA).

BACKGROUND OF THE INVENTION

Explosive materials are generally reactive substances which have a great amount of potential energy that can give an explosion accompanied by light, heat, sound and pressure. Among the explosive materials, nitro compounds like 2,4-dinitrotoluene (2,4-DNT), 2,4,6-trinitrotoluene (TNT), 1,3,5-tinitroperhydroxo-1,3,5-tetrazine (RDX), etc are some of the generally used components. Apart from being used as an explosive material, nitro compounds like TNT are hazardous to human health which can cause various health concerns like anemia, abnormal liver function, etc. Considering the hazardous nature of the nitro compounds in terms of both security concerns and as a pollutant, the need for the detection of these materials has been the primary importance.

Researchers all over the globe have been working on various techniques for the detection of explosive material. Some of the known techniques are metal detectors which generally detect metal based weapons, canines with their superior sensing capabilities, X-ray machines by analyzing the density of the materials, neutron activation where the explosive materials is bombarded with neutrons which gives its elemental composition, and so on. Apart from the above mention techniques, spectroscopic techniques especially fluorescence based chemo sensors, due to their high sensitivity and probability of using as a hand held devices for in-field detection have superior advantage. Generally, in this approach, the fluorescent materials on interaction with the explosives materials either turn-off or quenches the luminescent of the sensors which relies on an oxidative quenching mechanism. In detail, the sensor material plays the role of an electron donors and aromatic nitro compounds as an electron acceptor due to the presence of their electron withdrawing nitro groups. On excitation with photon, an electron is transferred from the sensor materials to the analyte, leading to oxidation of the excited state, thereby quenching the fluorescence of the sensors. Some of the generally used fluorescent materials are conjugated polymers, metal complexes, dendrimers, carbon nanotubes, and recently the use of metal organic framework (MOF) as the new generation of sensors materials for explosive detection.

Article titled, "Enhanced emission of ultra-small-sized LaF$_3$:RE$^{3+}$ (RE=Eu, Tb) nanoparticles through 1,2,4,5-benzenetetracarboxylic acid sensitization" by Suwen Li et. al in Nanoscale, 2012, 4, 5619-5626 reports that uniform, ultra-small-sized and well-water-dispersible LaF$_3$ nanoparticles doped with trivalent rare earth (RE) ions (Eu$^{3+}$ or Tb$^{3+}$) have been synthesized by a simple, low temperature synthesis route. The nanoparticles, with sizes of about 3.2 nm (for those doped with Eu$^{3+}$) and 3.0 nm (for those doped with Tb$^{3+}$), are roughly spherical and monodisperse. 1,2,4,5-Benzenetetracarboxylic acid (labeled as BA) as sensitizer has been bonded to the surface of the nanoparticles, which can sensitize the emission of RE$^{3+}$ in the LaF$_3$ nanoparticles. The BA-LaF$_3$:RE$^{3+}$ (RE=Eu or Tb) nanoparticles have a broad absorption band in the UV domain, and show enhanced luminescence of RE$^{3+}$ based on an energy transfer from BA ligands to RE$^{3+}$ ions (i.e. the so-called "antenna effect"). Due to the dual protection of organic ligands (BA) and inorganic matrices (LaF$_3$), BA-LaF$_3$:RE$^{3+}$ (RE=Eu or Tb) nanoparticles have longer excited state lifetimes than LaF$_3$:RE$^{3+}$ (RE=Eu or Tb) nanoparticles as well as lanthanide coordination polymers of BA.

Article titled, "Multifunctional inorganic-organic hybrid nanospheres for rapid and selective luminescence detection of TNT in mixed nitro aromatics via magnetic separation." by Ma Y et. al in Talanta. 2013 Nov. 15; 116:535-40 reports rapid, sensitive and selective detection of 2,4,6-trinitrotoluene (TNT) in aqueous solution differentiating from other nitroaromatics and independent of complicated instruments is in high demand for public safety and environmental monitoring. In this work, via a simple and versatile method, LaF3:Ce(3+)—Tb(3+) and Fe3O4 nanoparticle-codoped multifunctional nanospheres were prepared through self-assembly of the building blocks. The luminescence of these nanocomposites was dramatically quenched via adding nitroaromatics into the aqueous solution. After the magnetic separation, however, the interference of other nitroaromatics including 2,4,6-trinitrophenol (TNP), 2,4-dinitrotoluene (DNT), and nitrobenzene (NB) was effectively overcome due to the removal of these coexisting nitroaromatics from the surface of nanocomposites. Due to the formation of TNT(−)—RCONH3(+), the TNT was attached to the surface of the nanocomposites and was quantitatively detected by the post exposure luminescence quenching. Meanwhile, the luminescence intensity is negatively proportional to the concentration of TNT in the range of 0.01-5.0 μg/mL with the 3σ limit of detection (LOD) of 10.2 ng/mL.

Article titled, "Energy transfer from benzoic acid to lanthanide ions in benzoic acid-functionalized lanthanide-doped CaF$_2$ nanoparticles" by Jianshe Wang et. al in Applied Surface Science, Volume 257, Issue 16, 1 Jun. 2011, Pages 7145-7149 reports the preparation of benzoic acid-functionalized CaF$_2$:Ln$^{3+}$ (Ln=Eu or Tb) nanoparticles and their sensitized luminescence. First, to achieve sufficient proof for energy transfer from benzoic acid (BA) to lanthanide ions doped in nanoparticles, we employ Eu$^{3+}$ as the microscopic probe and investigate the luminescent spectra of benzoic acid-functionalized CaF$_2$:Eu$^{3+}$ (BA-CaF$_2$:Eu$^{3+}$) nanoparticles. Next, to further reveal the difference between sensitized luminescence and common luminescence for Eu$^{3+}$ doped in CaF$_2$ nanoparticles, we study the emission spectra of BA-CaF$_2$:Eu$^{3+}$ nanoparticles excited at 286 nm and 397 nm, respectively. Finally, we analyze and compare the luminescent spectra of BA-CaF$_2$:Tb$^{3+}$ and CaF$_2$:Ce$^{3+}$, Tb$^{3+}$ nanoparticles in detail.

Article titled, "Inkjet printing lanthanide doped nanorods test paper for visual assays of nitroaromatic explosives" by Liang Hong in Analytica Chimica Acta, Volume 802, 13 Nov. 2013, Pages 89-94 reports the inkjet printed polyethylenimine (PEI)-coated Ce, Tb co-doped NaGdF$_4$ nanorods (NaGdF$_4$:Ce/Tb NRs) onto common filter paper to construct test paper for visual and instant detections of a typical explosive 2,4,6-trinitrophenol (TNP). Polyethylenimine molecules not only facilitate the formation of uniform NaGdF$_4$ nanorods but also provide specific recognized sites for TNP by the acid-base pairing interaction. The resultant TNP bound at the surface of PEI-coated NaGdF$_4$:Ce/Tb NRs can strongly quench the phosphorescence with a remarkably high quenching constant by the charge transfer mechanism from NaGdF$_4$:Ce/Tb NRs to TNP. By printing of the probe on a piece of filter paper, trace amounts of TNP can be visually detected by the appearance of a dark color against a bright green background under a UV lamp. This test paper can detect TNP as low as 0.45 ng mm$^{-2}$ by the naked eye, which provides a potential application in the rapid, on-line detections of explosives.

Article titled, "Ligand-centered near-infrared luminescence from lanthanide complexes with chelating nitronyl nitroxide free radicals" by Christophe Lescop in Inorganic Chemistry, September 2000; 39(17), 3740-1 reports Lanthanum(III), europium(III), and gadolinium(III) complexes with chelating nitronyl nitroxide free radicals showing luminescence between 700 and 1000 nm.

Article titled, "Formation and Luminescence Phenomena of LaF3:Ce3+ Nanoparticles and Lanthanide-Organic Compounds in Dimethyl Sulfoxide" by Wei Chen et. al in The Journal of Physical Chemistry C, December 2009; 114(2) reports LaF3:Ce3+-doped nanoparticles synthesis at different temperatures in dimethyl sulfoxide (DMSO) by the chemical reaction of lanthanum nitrate hydrate and cerium nitrate hexahydrate with ammonium fluoride. The formation of Ce3+-doped LaF3 nanoparticles is confirmed by X-ray diffraction and high-resolution transmission electron microscopy. An intense emission at around 310 nm from the d-f transition of Ce3+ was observed from the LaF3:Ce3+ powder samples. However, in solution samples, the ultraviolet emission from Ce3+ is mostly absent, but intense luminescence is observed in the visible range from blue to red. Article titled, "Lanthanide-doped calcium phosphate nanoparticles with high internal crystallinity and with a shell of DNA as fluorescent probes in cell experiments" by Sussette Padilla Mondéjar et. al in J. Mater. Chem., 2007, 17, 4153-4159 reports Calcium phosphate nanoparticles prepared by precipitation and stabilized as colloids by coating with DNA. They were doped with europium or terbium during this precipitation (about 2.5 wt %) and showed good fluorescence in the visible part of the spectrum.

Article titled "Lanthanide Sensitization in II-VI Semiconductor Materials: A Case Study with Terbium(III) and Europium(III) in Zinc Sulfide Nanoparticles" by Prasun Mukherjee et. al in J. Phys. Chem. A, 2011, 115 (16), pp 4031-4041 reports the sensitization of luminescent lanthanide $Tb^{3+}$ and $Eu^{3+}$ cations by the electronic structure of zinc sulfide (ZnS) semiconductor nanoparticles. Excitation spectra collected while monitoring the lanthanide emission bands reveal that the ZnS nanoparticles act as an antenna for the sensitization of $Tb^{3+}$ and $Eu^{3+}$. This model implies that the mechanisms of luminescence sensitization of $Tb^{3+}$ and $Eu^{3+}$ in ZnS nanoparticles are different; namely, $Tb^{3+}$ acts as a hole trap, whereas $Eu^{3+}$ acts as an electron trap. Further testing of this model is made by extending the studies from ZnS nanoparticles to other II-VI semiconductor materials; namely, CdSe, CdS, and ZnSe.

Article titled, "X-ray luminescence of LaF3:Tb3+ and LaF3:Ce3+, Tb3+ water-soluble nanoparticles" by Yuanfang Liu in J. Appl. Phys. 103, 063105 (2008) reports x-ray luminescence from LaF3:Ce3+,Tb3+ and LaF3:Tb3+ water-soluble nanoparticles. The x-ray luminescence is dominated by emission from Tb3+ ions, similar to photo luminescence spectra of the nanoparticle aqueous solutions and spectra from nanoparticle powders precipitated from the aqueous samples. Coating the nanoparticles with an insulating inorganic LaF3 or organic H2N—(CH2)10-COOH layer can enhance the x-ray luminescence from the aqueous nanoparticles.

Article titled, "LaPO$_4$:Ce,Tb and YVO$_4$:Eu nanophosphors: Luminescence studies in the vacuum ultraviolet spectral range" by V. Pankratov in JOURNAL OF APPLIED PHYSICS, 110, 053522 (2011) reports comparative analysis of the luminescent properties of nanocrystalline LaPO$_4$:Ce, Tb and YVO$_4$:Eu luminescent materials with macrocrystalline analogues, commercially produced by Philips, has been performed under excitation by pulsed vacuum ultraviolet (VUV) synchrotron radiation, ranging from 3.7-40 eV. Special attention was paid to VUV spectral range, which is not reachable with commonly used lamp and laser sources.

US 2012/0288949 A1 relates to a method for determining the presence or amount of a compound in a sample by interparticle distance-dependent sensing, comprising:
(a) contacting the sample suspected of containing the compound with rare earth doped metal oxide nanoparticles; and
(b) detecting the compound by determining the change in luminescent properties of the rare earth doped metal oxide nanoparticles upon contact with the sample.

Article titled, "Trace Explosives Detection by Photoluminescence" by E. Roland Menzel in The Scientific World JOURNAL (2004) 4, 55-66 reports a general lanthanide-based photoluminescence approach which shows promise and the ability to photoluminescence-detect trace explosives in the presence of intense background color and/or background fluorescence by time-resolved imaging.

CN 102071027 A discloses water-soluble rare-earth terbium ion-doped cerium fluoride nanocrystallines and a preparation method thereof.

CN 101864298 A discloses a two rare earth complexes doping Ag@SiO2 fluorescent nanoparticles, characterized in that the fluorescent nanoparticles to double rare earth complexes Eu3+/Tb3+-PABA-DTPA-APTMS silver doped core, the core surface is covered with mesh silica-like structure, with an active surface in Guangxi dioxide amino groups, which double rare earth complexes Eu3+/Tb3+-PABA-DTPA-APTMS mass ratio of silver is: 1:0.176 to 0.2; kernel dioxide silicon mass ratio: 1:5 to 12, and each mg containing 595-630 nmol nanoparticle group. Article titled, "A Strategy to Protect and Sensitize Near-Infrared Luminescent $Nd^{3+}$ and $Yb^{3+}$: Organic Tropolonate Ligands for the Sensitization of $Ln^{3+}$-Doped NaYF$_4$ Nanocrystals" by Stéphane Petoud in J. Am. Chem. Soc., 2007, 129 (48), pp 14834-14835 reports a strategy to sensitize and protect near-infrared (NIR) emitting $Nd^{3+}$ and $Yb^{3+}$.

The reported prior arts have drawbacks like costly process, high detection level and multi-step method. Therefore it is the need to develop an easier, quick and effective method for detection of nitro containing compounds preferably explosives with low detection level.

OBJECTIVE OF THE INVENTION

The main object of the present invention is to provide para amino benzoic acid (pABA) sensitized terbium ($Tb^{3+}$) doped spherical LaF$_3$ nanoparticles.

Another object of the present invention is to provide a method for the detection of highly explosive nitro compounds and determination of pH of a solution utilizing the pABA sensitized terbium ($Tb^{3+}$) doped spherical $LaF_3$ nanoparticles.

Yet another object of the present invention is to provide pABA functionalized nanoparticles with remarkable enhancement in the luminescence intensity.

Yet another object of the present invention is to provide a method for the detection of selected nitro compound in the range of 0.04-10 ppm.

Yet another object of the present invention is to provide a method for the detection of explosives.

SUMMARY OF THE INVENTION

Accordingly, the present invention provides a para amino benzoic acid (pABA) sensitized terbium ($Tb^{3+}$) doped spherical $LaF_3$ nanoparticles comprising pABA in the ratio of 1:1.

In another embodiment, present invention provides a process for preparation of para amino benzoic acid (pABA) sensitized terbium ($Tb^{3+}$) doped spherical $LaF_3$ nanoparticles and the said process comprising the steps of:
i. mixing of lanthanum nitrate hexahydrate ($La(NO_3)_3 \cdot 6H_2O$) and terbium nitrate pentahydrate ($Tb(NO_3)_3 \cdot 5H_2O$) in the ratio ranging between 2 to 10 wt. %;
ii. adding citric acid solution to the solution as obtained in step (i) at temperature in the range of 60-70° C.; followed by adding $NH_4F$ to obtain the reaction mixture;
iii. refluxing the reaction mixture at temperature in the range of 100 to 110° C. for period in the range of 100 to 120 minutes followed by cooling and drying at temperature in the range of 24-30° C. to obtain nanoparticles;
iv. functionalizing the nanoparticles as obtained in step (iii) by dispersing in water followed by adding p-aminobenzoic acid solution at temperature in the range of 60 to 65° C. and refluxing for period in the range of 100 to 120 minutes at temperature in the range of 70 to 75° C. to obtain surface-functionalized nanoparticles.

In still another embodiment of the present invention, said nanoparticles are useful for detection of nitro group containing compounds by determining the quenching of fluorescence of terbium ($Tb^{3+}$) doped spherical $LaF_3$ nanoparticles by the addition nitro group containing compound.

In still another embodiment of the present invention, the detection level of nitro compounds is in the range of 0.04 to 10 ppm.

In yet another embodiment of present invention, the nitro group containing compound is selected from aromatic or aliphatic compounds.

In still another embodiment of present invention, the nitro group containing compounds are selected from nitrobenzene (NB), o-nitrophenol(2-NP), o-nitrotoluene(2-NT), 2,4-dinitrotoluene (2,4-DNT), 2,6-dinitrotoluene (2,6-DNT), 2,4-dinitrophenol(2,4-DNP), picric acid(PA) and 2,4,6-trinitrotoluene (TNT), nitromethane (NM), 1,2,4-butanetriol nitrate (BTTN), octahydro-1,3,5,7-tetranitro-1,3,5,7-tetrazocine (HMX), and 1,3,3-Trinitroazetidine(TNAZ).

In yet another embodiment of present invention, the order of fluorescence quenching is 2,6-dinitrotoluene (2,6-DNT)>o-nitrophenol(2-NP)>2,4-dinitrophenol(2,4-DNP)>nitrobenzene(NB), 2,4,6-trinitrotoluene (TNT)>picric acid (PA)>1,3,5-trinitroperhydro-1,3,5-triazine (RDX)>2,6-dinitrotoluene (2,6-DNT)>>o-nitrotoluene(2-NT)>1,3,3-Trinitroazetidine(TNAZ)>octahydro-1,3,5,7-tetranitro-1,3,5,7-tetrazocine (HMX)>nitromethane (NM), 1,2,4-butanetriol nitrate (BTTN) and the values of quenching constant ($k_Q$), obtained for TNT, PA, 2-NP, 2,4-DNT, 2,4-DNP are 12295, 5738, 1683, 3296, 2103 $M^{-1}$ respectively.

In yet another embodiment of present invention, the pABA functionalized terbium ($Tb^{3+}$) doped spherical $LaF_3$ nanoparticles shows 100-120 times enhancement in the luminescence intensity in comparison to direct excitation of $Tb^{3+}$ ion.

In still another embodiment of the present invention, said nanoparticles are useful for the detection of pH acidic or alkaline solution and the said nano particles possess UV-absorption peak at 265 at pH=3.

In still another embodiment of the present invention, the life time value of the surface functionalized nanoparticles in absence of an analyte is 0.1177 ns.

In still another embodiment of the present invention, the life time value of the surface functionalized nanoparticles in presence of picric acid analyte is the concentration of 18, 61.25 and 125 ppm are 0.1158, 0.0883, and 0.0806 ns respectively.

ABBREVIATIONS

Nitrobenzene (NB), o-nitrophenol(2-NP), o-nitrotoluene (2-NT), 2,4-dinitrotoluene (2,4-DNT), 2,6-dinitrotoluene (2,6-DNT), 2,4-dinitrophenol (2,4-DNP), picric acid (PA), 2,4,6-trinitrotoluene (TNT) and some aliphatic nitro compounds such as nitromethane (NM), 1,2,4-butanetriol nitrate (BTTN), octahydro-1,3,5,7-tetranitro-1,3,5,7-tetrazocine (HMX), and 1,3,3-Trinitroazetidine(TNAZ).

BRIEF DESCRIPTION OF THE DRAWINGS

FIG. 15 depicts colour change of the particles in presence of explosives under UV light irradiation.

DETAILED DESCRIPTION OF THE INVENTION

The present invention provide para amino benzoic acid (pABA) sensitized terbium (Tb$^{3+}$) doped spherical LaF$_3$ nanoparticles and a method for the detection of highly explosive nitro compounds and determination of pH of a solution utilizing the para amino benzoic acid (pABA) sensitized terbium (Tb$^{3+}$) doped spherical LaF$_3$ nanoparticles.

The present invention provides a process for the detection of nitro group containing compound using the terbium (Tb$^{3+}$) doped spherical LaF$_3$ nanoparticles comprising of the steps of:
 a) determining the flourescence of terbium (Tb$^{3+}$) doped spherical LaF$_3$ nanoparticles;
 b) adding para amino benzoic acid (pABA) to terbium (Tb$^{3+}$) doped spherical LaF$_3$ nanoparticles of step (a) in the ratio ranging between 2 to 10 wt. % and determining the enhanced fluorescence; and
 c) adding the sample of step (b) with the nitro group containing compound and determining the quenching of fluorescence of terbium (Tb$^{3+}$) doped spherical LaF$_3$ nanoparticles by nitro group containing compound.

The present invention provides a process wherein the nitro group containing compound is selected from aromatic or aliphatic compounds.

The present invention provides a method for the detection of pH of an unknown acidic or alkaline solution by studying the variation of the photoluminescence properties of the para amino benzoic acid (pABA) sensitized LaF$_3$:Tb$^{3+}$ nanomaterials at different pH.

The present invention provides para amino benzoic acid (pABA) functionalized LaF$_3$:Tb$^{3+}$ nanoparticles (FIG. 3a) with strong broad UV-absorption peak having maximum at 265 nm having absorption intensity highest at pH=3.

Figure 3:
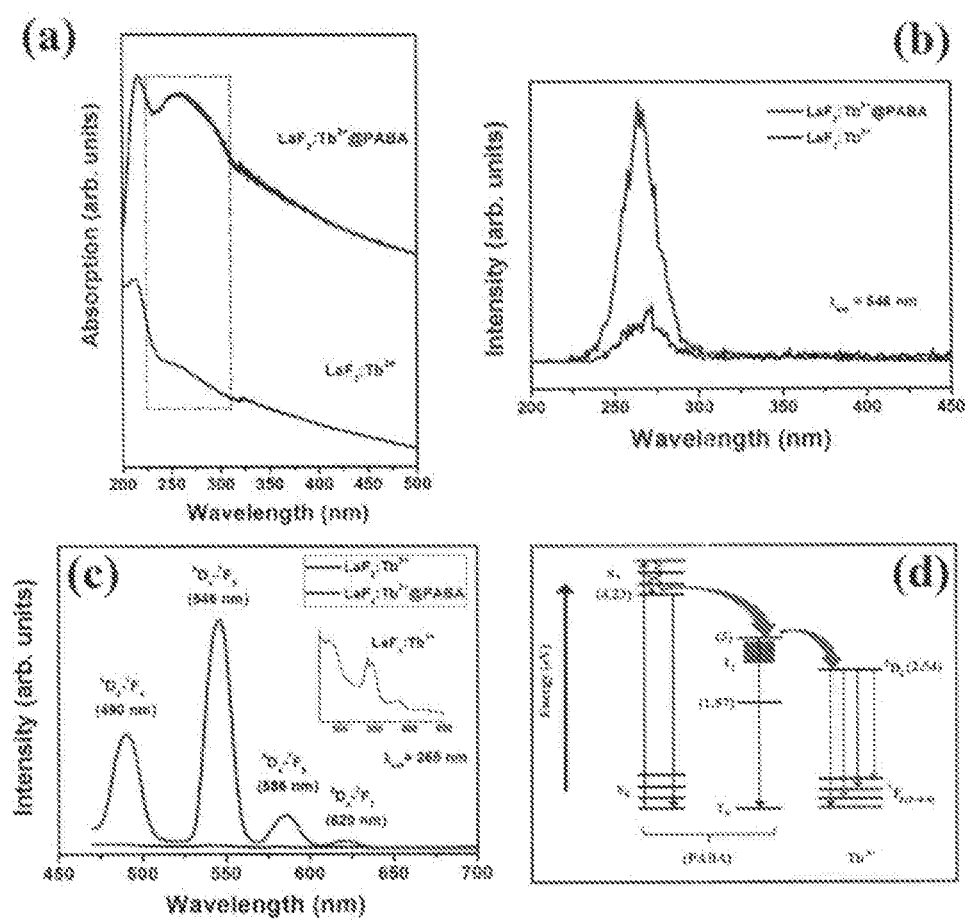
FIG. 3 depicts (a) Absorption, (b) excitation and (c) emission spectra of $LaF_3:Tb^{3+}$ with and without pABA along with (d) schematic diagram for the energy transfer in $LaF_3:Tb^{3+}$@pABA nanoparticles. Excitation and emission wavelength are fixed at 265 and 546 nm, respectively

The pABA functionalized nanoparticles show remarkable (>100 times) enhancement in the luminescence intensity as compared to direct excitation of Tb$^{3+}$ ion as shown in FIG. 3c. The detection level for the selected nitro compound is in the range of 0.04-10 ppm. The surfaced functionalised nanomaterials is able to detect TNT up to 50 ppb.

The technique of utilizing the Tb$^{3+}$ doped NPs sensitized by para amino benzoic acid (pABA) have potential application in the detection of explosives.

The present invention provides Tb$^{3+}$ doped nanoparticles which are highly sensitive as well as selective to the aromatic nitro compounds as compared with the aliphatic nitro compounds.

The present invention provides detection of nitro group containing compounds selected from the group consisting of nitrobenzene(NB), o-nitrophenol(2-NP), o-nitrotoluene(2-NT), 2,4-dinitrotoluene (2,4-DNT), 2,6-dinitrotoluene (2,6-DNT), 2,4-dinitrophenol(2,4-DNP), picric acid(PA) and 2,4,6-trinitrotoluene (TNT), nitromethane (NM), 1,2,4-butanetriol nitrate (BTTN), octahydro-1,3,5,7-tetranitro-1,3,5,7-tetrazocine (HMX), and 1,3,3-Trinitroazetidine(TNAZ).

Figure 8:
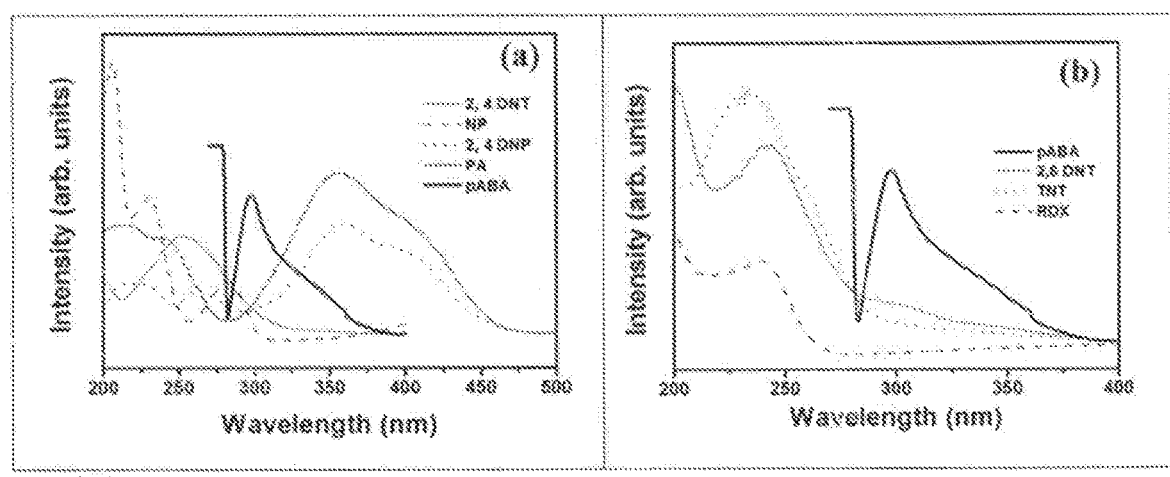
FIG. 8 depicts overlap of emission spectrum of pABA with UV spectra for (a) NP, 2,4-DNP, PA, DNT and (b) 2,6-DNT, TNT, RDX.
Figure 13:
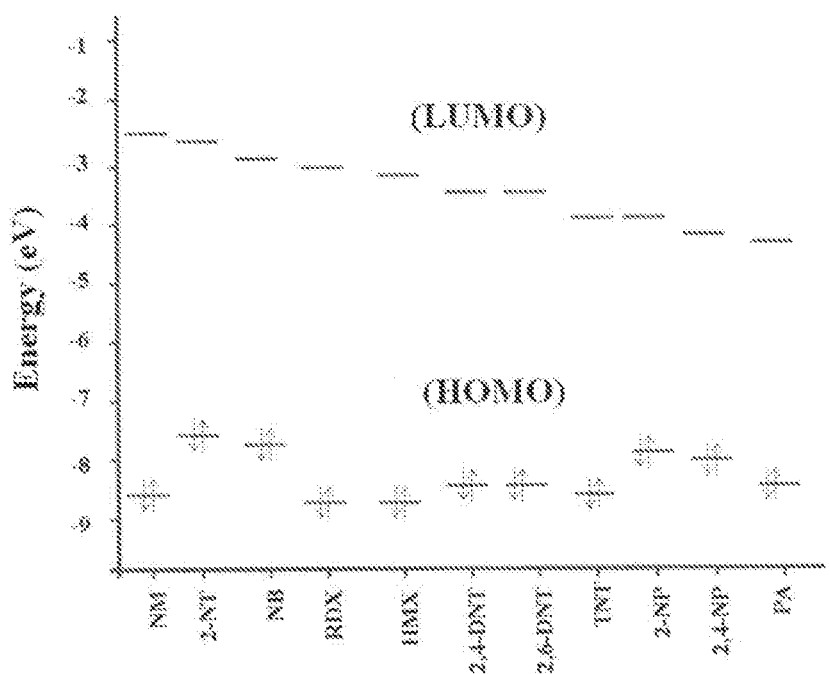
FIG. 13 depicts Energy level diagram of all the selected nitro compounds.

The present invention provides the order of fluorescence quenching as follows: 2,6-dinitrotoluene (2,6-DNT)>o-nitrophenol(2-NP)>2,4-dinitrophenol(2,4-DNP)>nitrobenzene(NB), 2,4,6-trinitrotoluene (TNT)>picric acid(PA)>1,3,5-trinitroperhydro-1,3,5-triazine (RDX)>2,6-dinitrotoluene (2,6-DNT)>>o-nitrotoluene(2-NT)>1,3,3-Trinitroazetidine (TNAZ)>octahydro-1,3,5,7-tetranitro-1,3,5,7-tetrazocine (HMX)>nitromethane (NM), 1,2,4-butanetriol nitrate (BTTN). (FIGS. 8 and 13)

The present invention provides the values of quenching constant ($k_Q$), obtained using above Stern-Volmer equation for TNT, PA, 2-NP, 2,4-DNT, 2,4-DNP which are as follows 12295, 5738, 1683, 3296, 2103M$^{-1}$.

Life time value of the surface functionalized nanoparticles in absence of any analyte is 0.1177 ns. Further, in presence of 18, 61.25 and 125 ppm picric acid analyte life time values of the surface functionalized nanoparticles are 0.1158, 0.0883, and 0.0806 ns (nanosecond) respectively.

Life time values of the surface functionalized nanoparticles in presence of 10, 20 and 60 ppm TNT analyte are 0.0790, 0.0889, and 0.0785 ns respectively. (Refer FIG. 14)

EXAMPLES

Following examples are given by way of illustration and therefore should not be construed to limit the scope of the invention.

Reagents and Materials

Lanthanum nitrate hexahydrate (La(NO$_3$)$_3$.6H$_2$O) (99.99%), terbium nitrate pentahydrate (Tb(NO$_3$)$_3$.5H$_2$O) (99.9%), Ammonium fluoride (NH$_4$F) (99.99%) were purchased from Aldrich. Anhydrous citric acid (99.5%) and dimethyl sulfoxide (99.9%) were purchased from Merck. p-aminobenzoic acid from SDFCL and picric acid (PA) obtained from Aldrich. All the others nitro compounds listed below are obtained from DRDO-HEMRL, Pune. Deionised water was used to make aqueous solutions. All the materials were used as received.

Example 1

Synthesis of LaF$_3$:Tb$^{3+}$ Spheres

Tb$_x$La$_{1-x}$F$_3$ (where x=0.02, 0.04, 0.06, 0.08 and 0.1) nanoparticles were synthesized. 3 g of anhydrous citric was dissolved in 20 ml of water in 250 ml RB (Round bottom) flask. 60 ml of DMSO (Dimethyl sulphoxide) and 1 ml conc. NH$_4$OH were added to the citric acid solution to adjust the pH to 5 and stirred nicely. About 2 mmol (depending upon doping conc.) of lanthanum nitrate hexahydrate (La (NO$_3$)$_3$.6H$_2$O) and stoichiometric amount of terbium nitrate pentahydrate (Tb(NO$_3$)$_3$.5H$_2$O) were dissolved in 2 ml water. This lanthanide solution was added drop wise to the citric acid solution at 70° C. temperature. A dense white turbidity appeared. White dense turbidity converted to a pale white suspension when 3 ml aq. solution of 7 mmol NH$_4$F was added slowly. The reaction mixture was refluxed at 110° C. temperature under water circulation for two hours and then cooled to 30° C. The nanoparticles were collected by centrifugation, washed with deionized (DI) water and methanol, and dried at 30° C.

Surface-Functionalization of Nanoparticles 0.2 g of the resulting nanoparticles was dispersed in 50 ml water and formed a colloidal solution. 0.2 g of p-aminobenzoic acid was dissolved in 30 ml NaOH solution. This p-aminobenzoic acid solution was added slowly to the nanoparticles colloid at 65° C. and refluxed for two hours at 75° C. The surface-functionalized nanoparticles were separated by centrifugation, washed twice with water and methanol and dried at 30° C.

Example 2

Preparation of Analyte Solution 500 mg picric acid was dissolved in 1000 ml water to prepare a stock solution of 500 ppm (2.18 mM) strength. This mother solution was followed by a two-fold serial dilution to prepare the solutions of 250, 125, 62.5, 31, 15.5, 8, 4, 2 ppm concentrations. These analyte solutions were mixed with equal volume of aqueous dispersion of the nanoparticles and analyzed, i.e the analyte concentrations in the experimental solutions were again diluted to half concentration.

Example 3

3 mg of 2,4,6-trinitrotoluene was dissolved in 25 ml water to prepare a 120 ppm (0.52 mM) stock solution. This solution was diluted with water to prepare 100 ppm, 80 ppm, 60 ppm, 40 ppm, 20 ppm solutions which on mixing with equal volume dispersion of nanoparticles gave the experimental solutions.

Example 4

7 mg of nitrophenol was dissolved in 250 ml of water to prepare a 0.2 mM stock solution (28 ppm) This solution was diluted with water to prepare 14 ppm, 7 ppm, 3.5 ppm, 1.75 ppm solution which on mixing on mixing with equal volume dispersion of nanoparticles gave the experimental solutions.

Example 5

9 mg of 2,4-dinitrophenol was dissolved in 250 ml of water to prepared a 0.2 mM stock solution (36 ppm) This solution was diluted with water to prepare 18 ppm, 9 ppm, 4.5 ppm, 2 ppm solution which on mixing with equal volume dispersion of nanoparticles gave the experimental solutions.

Example 6

9 mg of 2,4-dinitrotoluene was dissolved in 250 ml of water to prepared a 0.2 mM stock solution (36 ppm) This solution was diluted with water to prepare 18 ppm, 9 ppm, 4.5 ppm, 2 ppm solution which on mixing with equal volume dispersion of nanoparticles gave the experimental solutions.

Example 7

6.9 mg of o-nitrotoluene was dissolved in 250 ml water to prepare a 0.2 mM stock solution.

Example 8

9 mg of nitrobenzene was dissolved in 250 ml water to prepare a 0.2 mM stock solution.

Example 9

9 mg of nitromethane was dissolved in 250 ml water to prepare a 0.2 mM stock solution.

Example 10

12 mg of 1,2,4-butanetriol nitrate was dissolved in 250 ml water to prepare a 0.2 mM stock solution.

Example: 11

9.6 mg of 1,3,3-Trinitroazetidine was dissolved in 250 ml water to prepare a 0.2 mM stock solution.

Example 12

11 mg of RDX was dissolved in 250 ml water to prepare a 0.2 mM stock solution.

Example 13

15 mg of octahydro-1,3,5,7-tetranitro-1,3,5,7-tetrazocine was dissolved in 250 ml water to prepare a 0.2 mM stock solution.

Characterization

1. XRD Study

Figure 1:
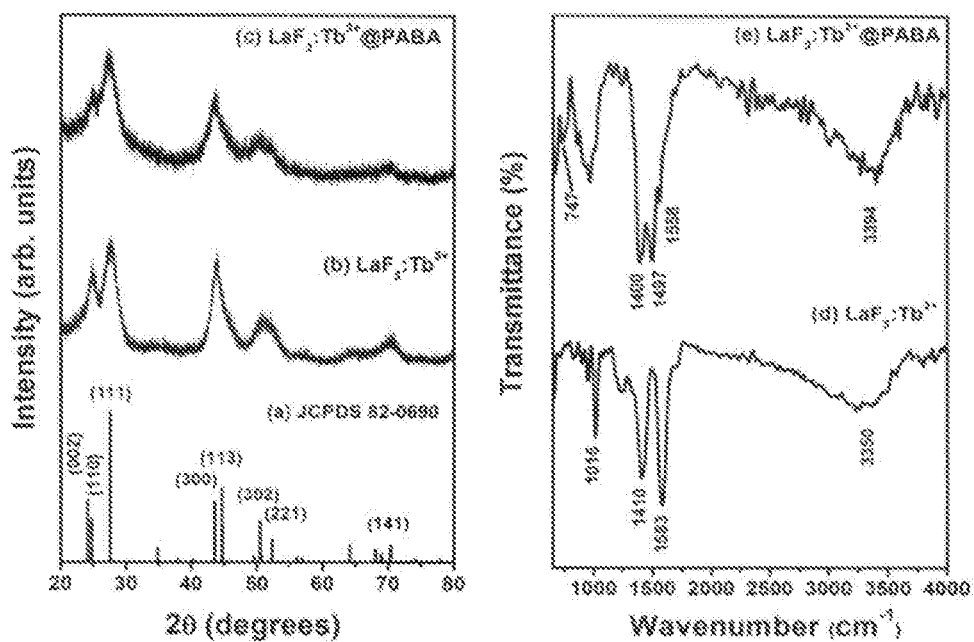
FIG. 1 depicts XRD (X-ray diffraction) and IR spectra of $LaF_3:Tb^{3+}$ nanoparticles with and without pABA along with the JCPDS Card No. 82-0690.

All the samples analyzed (before and after surface functionalization) had clear resemblance with the tysonite structure of LaF$_3$ (JCPDS card 82-0690) as shown in FIG. 1(*a-c*). The average crystallite size of the nanoparticles were calculated using Scherrer equation (d=k$\lambda$/$\beta$ cos $\theta$), where $\lambda$ is the X-ray wavelength (0.154 nm), $\beta$ is the full width at half-maximum (fwhm) of a diffraction peak, $\theta$ is the diffraction angle, k is a constant (0.89). Average crystallite size of LaF$_3$:Tb$^{3+}$ and LaF$_3$:Tb$^{3+}$@pABA nanoparticles are in the range of (5.52-6.29) and (4.50-5.53) nm respectively, at different concentration of the dopant, Tb$^{3+}$ as summarized in Table 1.

There is a broadening of peaks after the surface functionalization as can be observed from the gradual increase in the FWHM value of the (111) plane from (2.49-2.71) to (2.70-3.12) nm on moving from LaF$_3$:Tb$^{3+}$ to LaF$_3$:Tb$^{3+}$@PABA nanoparticles (Table 1).

The reason for the shrinking phenomenon of the unit cell volume is due to the smaller ionic radius of Tb$^{3+}$ (0.923 Å) as compared to that of La$^{3+}$ ion (1.032 Å). All the above analysis indicates that Tb$^{3+}$ ions have been successfully doped into the lattice of LaF$_3$ nanomaterials.

TABLE 1

Crystallite size, Lattice parameter, Unit cell volume and FWHM (Full Width Half Maximum) of pABA functionalised and non-functionalised LaF$_3$:Tb$^{3+}$ NPs.

| S. No. | Sample | Crystallite size (nm) | Lattice parameter a = b | c | Unit cell volume (Å$^3$) | FWHM (111) |
|---|---|---|---|---|---|---|
| 1 | LaF$_3$:Tb$^{3+}$ (2%) | 5.52 | 7.19 | 7.43 | 332.90 | 2.70 |
| 2 | LaF$_3$:Tb$^{3+}$ (4%) | 5.90 | 7.17 | 7.44 | 331.99 | 2.50 |
| 3 | LaF$_3$:Tb$^{3+}$ (6%) | 5.74 | 7.17 | 7.50 | 334.10 | 2.61 |
| 4 | LaF$_3$:Tb$^{3+}$ (8%) | 5.59 | 7.17 | 7.42 | 330.95 | 2.71 |
| 5 | LaF$_3$:Tb$^{3+}$ (10%) | 6.29 | 7.16 | 7.31 | 325.23 | 2.49 |
| 6 | LaF$_3$:Tb$^{3+}$ (2%)@PABA | 4.50 | 7.19 | 7.43 | 340.67 | 3.12 |
| 7 | LaF$_3$:Tb$^{3+}$ (4%)@PABA | 5.28 | 7.17 | 7.44 | 336.10 | 2.70 |
| 8 | LaF$_3$:Tb$^{3+}$ (6%)@PABA | 5.08 | 7.17 | 7.50 | 341.27 | 2.93 |
| 9 | LaF$_3$:Tb$^{3+}$ (8%)@PABA | 4.57 | 7.17 | 7.42 | 338.62 | 3.02 |
| 10 | LaF$_3$:Tb$^{3+}$ (10%)@PABA | 5.53 | 7.16 | 7.31 | 332.71 | 3.14 |

2. IR Study

The broad peak (FIG. 1d) in the range of 3000-3500 cm$^{-1}$ can be assigned to the stretching vibration of O—H group of carboxylic acid. Peaks at 1583 cm$^{-1}$ and 1410 cm$^{-1}$ are assigned to asymmetric and symmetric stretching vibrations of carboxylic group. Strong peak at 1016 cm$^{-1}$ is due to C—O stretching of citric acid. The spectra of the functionalized nanoparticle (FIG. 1e) show two new peaks at 1497 cm$^{-1}$ and 747 cm$^{-1}$ which is due to C—C stretching vibration and out of plane C—H bending vibrations of benzene ring, respectively. The peaks at 1558 cm$^{-1}$ and 1400 cm$^{-1}$ are due to the carboxylic acid group of pABA. Broad peak above 3000 cm$^{-1}$ can be assigned to amine group of pABA. The above analysis confirms that pABA has been successfully attached on the surface of the nanoparticles.

3. Morphology and Elemental Composition Analysis

Figure 2:
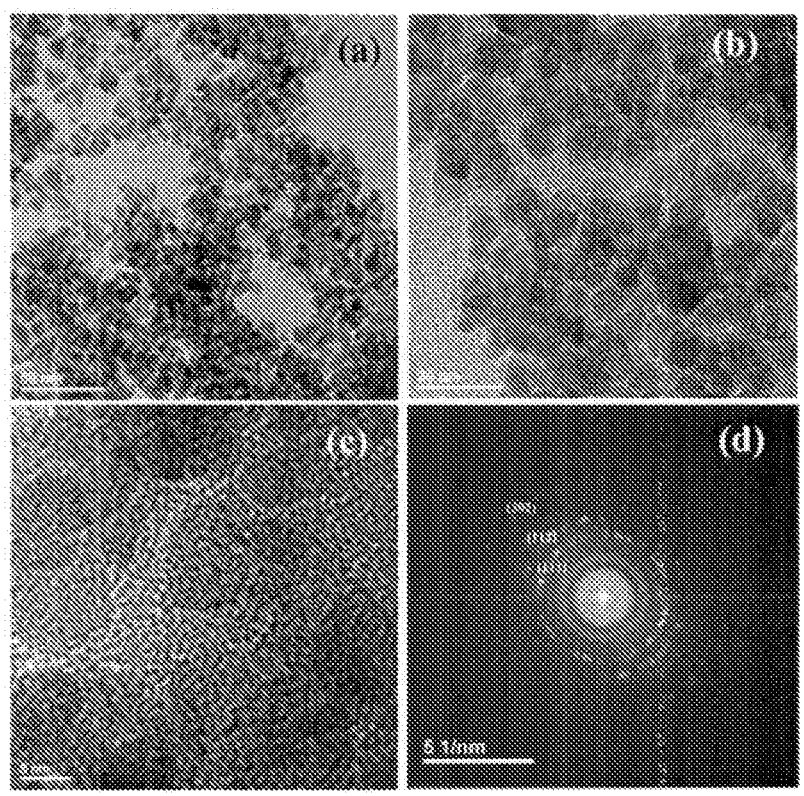
FIG. 2 depicts the morphology of $LaF_3:Tb^{3+}$@pABA nanoparticles (a-c) along with (d) its SAED (Selected Area Electron Diffraction) and (e) its EDAX (Energy Dispersive X-ray Analysis) spectra. Rod shape morphology of higher dopant concentration is also shown (f).
Figure 2:
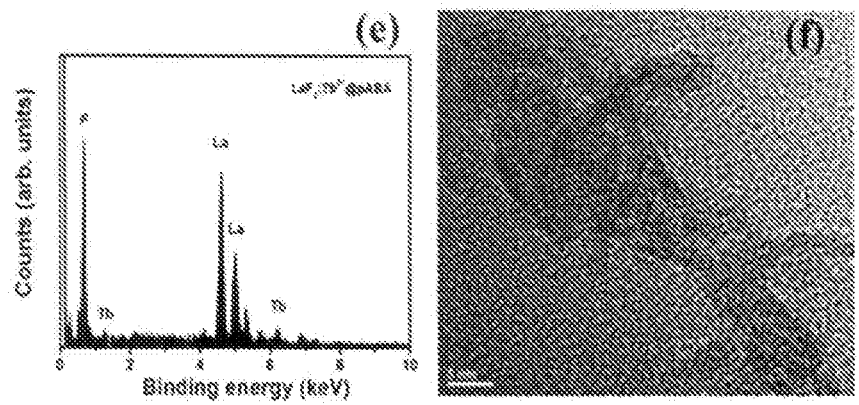

FIG. 2(a-c) shows the HRTEM (High Resolution Transmission Electron Microscope). images of as prepared surface functionalized LaF$_3$:Tb$^{3+}$@pABA NPs which shows the morphology of spherical shape. The average size of the spherical nanoparticles is 5.2 nm which is in good agreement with the value calculated from XRD. The lattice fringes are clearly observed and the experimentally observed d-spacing is found to be 0.32 nm which coincides with the (111) plane of tysonite structure (JCPDS card 82-0690) of LaF$_3$. Crystalline nature of the nanoparticles is well understood from the SAED pattern (FIG. 2d) and the major diffraction has been assigned to their corresponding planes. FIG. 2e shows the EDAX spectra of as-prepared LaF$_3$:Tb$^{3+}$@pABA NPs. All the typical peaks corresponding to La, F, Tb are observed in the spectra. At higher dopant concentration (10 at % of Tb$^{3+}$), the spherical shape morphology of the nanoparticles get converted to a rod shape morphology with an average length ~10 nm and width of ~2 nm as shown in FIG. 2f.

Figure 9:
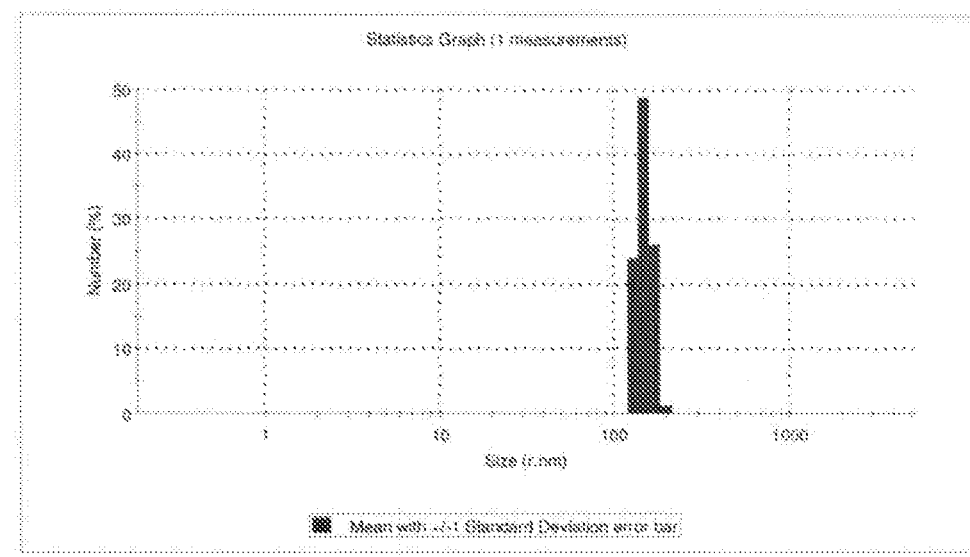
FIG. 9 depicts Histogram showing the particle size distribution (DLS (Dynamic Light Scattering) measurement) of LaF$_3$:Tb$^{3+}$@pABA nanoparticles

The particles are found to be agglomerated in nature. FIG. 9 shows the histogram of particle size distribution from the DLS measurement. The individual particles are found to be agglomerated in the size range of ~120-170 nm with ~150 nm constituting half of the total populations.

4. Absorption Study

Figure 10:
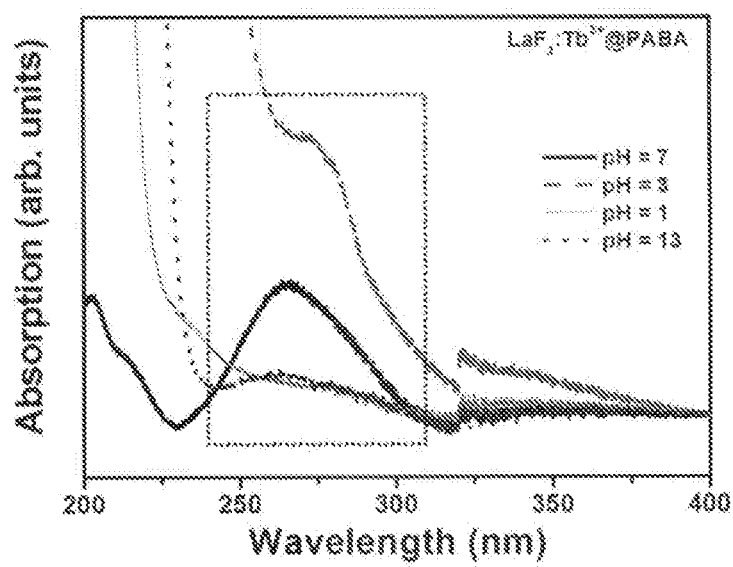
FIG. 10 depicts Absorption spectra of LaF$_3$:Tb$^{3+}$@pABA nanoparticles at different pH.

The absorption spectra of pABA functionalized and non-functionalized LaF$_3$:Tb$^{3+}$ nanoparticles is shown in FIG. 3a. In case of functionalized nanoparticles a new strong broad absorption peak having maximum at 265 nm appears which is not present for as prepared non-functionalized LaF$_3$:Tb$^{3+}$ nanoparticles. The functionalized nanoparticles show lowest absorption intensity at pH=1 (FIG. 10). Absorption intensity is highest at pH=3 which is almost double as compared to the absorption intensity at pH=7. The above analysis further confirms that the pABA sensitized LaF$_3$:Tb$^{3+}$ shows highest absorption activity at pH=3 and subsequently all the photoluminescence analysis has been performed at this optimum pH. Very low UV absorption in the alkaline medium where free —NH$_2$ group is present is due to very little dispersibility of the nanoparticles at pH=13.

5. Photoluminescence Studies

All the photoluminescence studies were performed in aqueous medium. Taking 50 mg/250 ml aqueous (pH=3) dispersions of pABA functionalized and non-functionalized LaF$_3$:Tb$^{3+}$ samples to examine the energy transfer or sensitization of Tb$^{3+}$ by pABA (FIG. 3b). When the functionalised nanoparticles are excited at pABA absorption maximum at 265 nm, it gives ~100 times stronger luminescence as compared to direct excitation (360 nm) of Tb$^{3+}$ ion as shown in FIG. 3c. The energy transfer process can be explained through the schematic diagram in FIG. 3d.

Figure 11:
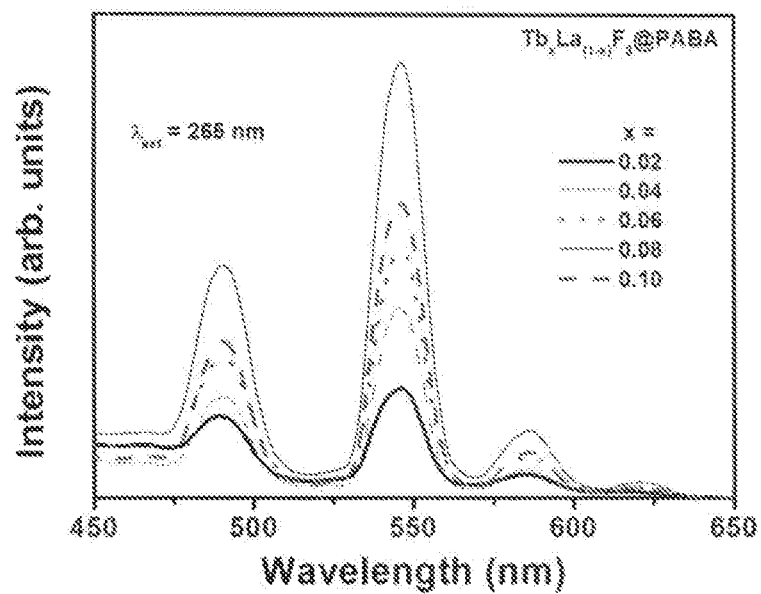
FIG. 11 depicts Emission spectra of LaF$_3$:Tb$^{3+}$@pABA nanoparticles at different concentration of Tb$^{3+}$ ions.

Radiative transitions of Tb$^{3+}$ ions gives typical three characteristic strong emission bands centered at 490 nm, 546 nm and 586 nm, among which the peak at 546 nm is the strongest one. Sensitized luminescence intensity increases with increase in Tb$^{3+}$ ion concentration in the LaF$_3$ nanoparticles (FIG. 11). But at 10% Tb$^{3+}$ concentration luminescence reduces due to concentration quenching. In the present study, the optimum concentration of the Tb$^{3+}$ ion was found to be 8%.

Example: 14

Variation on the Photoluminescence Properties with Change of pH

A 1000 ml of 0.2M HCl solution was prepared by diluting 17 ml conc. HCl solution to 1000 ml. This solution was followed by ten fold serial dilution to prepare HCl solutions of strength 0.02, 0.002, 0.0002, 0.00002 and 0.000002(M).

Figure 4:
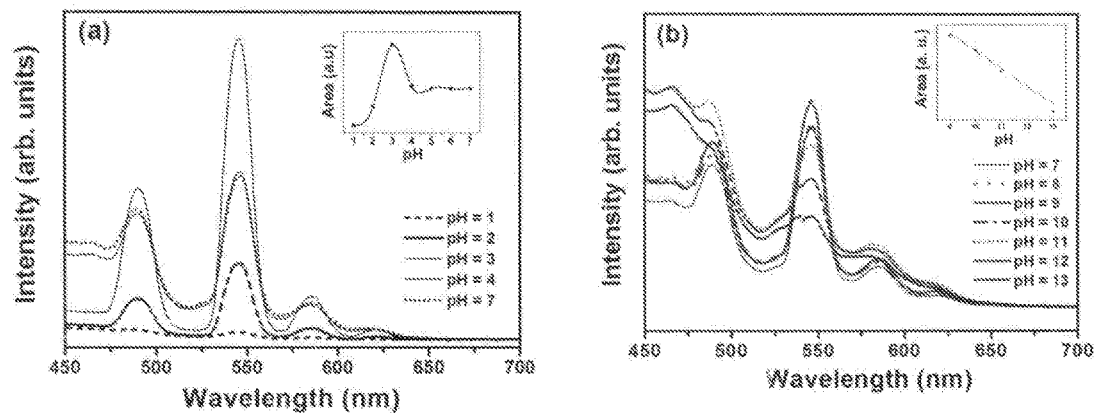
FIG. 4 depicts Effect of pH on the emission spectra $LaF_3:Tb^{3+}$@pABA nanoparticles at $\lambda_{ex}$=265 nm. Inset shows the integrated area under the curve for 546 nm peak.

Equal volume of 50 mg in 250 ml water dispersion of LaF$_3$:Tb$^{3+}$ (8%) @ pABA nanoparticles were mixed with the acid solution to prepare the experimental solutions of pH 1, 2, 3, 4, 5, 6. 0.4 g of NaOH was dissolved in 50 ml water to prepare a 0.2 (M) solution. And following the above procedure experimental solutions of pH 13, 12, 11, 10, 9 and 8 were prepared. All the samples were excited at 265 nm and variation in luminescence intensity of these samples were recorded in the wavelength range of 450-700 nm (FIG. 4).

Luminescence intensities in the pH range of 4-7 are almost same as shown in FIG. 4a. The integrated area of 546 nm peak shows that maximum at pH=3 (FIG. 4a). After pH=7, a slight enhancement in the luminescence is observed till pH=9. In the strong alkaline medium (pH=10-13), luminescence reduces below the neutral medium luminescence (FIG. 4b). Very low luminescence intensity in strongly acidic medium (pH=1) and strongly alkaline medium (pH=13) is experimentally supported by very low UV absorption intensities at that pH values (FIG. 10). Surface area to volume ratio (4 $\pi r^2/4$ $\pi r^3/3$) of these very small nanoparticles (~5 nm) is around $10^7$ cm$^{-1}$. A plot of integrated area of the most intense peaks at 546 nm vs pH shows a straight line having negative slope and taking an intercept on y-axis (Inset of FIG. 4b). This linear relationship can be used to detect pH of unknown alkaline medium.

Detection of Nitro Explosives

All the experiment for the detection of the nitro compounds (Example 15-26) were performed at the pH=3 and Tb$^{3+}$=8% ions concentration. Energy of LUMO of most of the aliphatic nitro explosives lies above that of pABA and hence no electron transfer as well as luminescence quenching is observed by the aliphatic nitro explosives (FIG. 13).

Example 15

To the aqueous dispersion of the pABA sensitized LaF$_3$:Tb$^{3+}$ nanoparticles, aqueous solution of nitrobenzene (NB), was added and its photoluminescence property was studied.

Example 16

Figure 6:
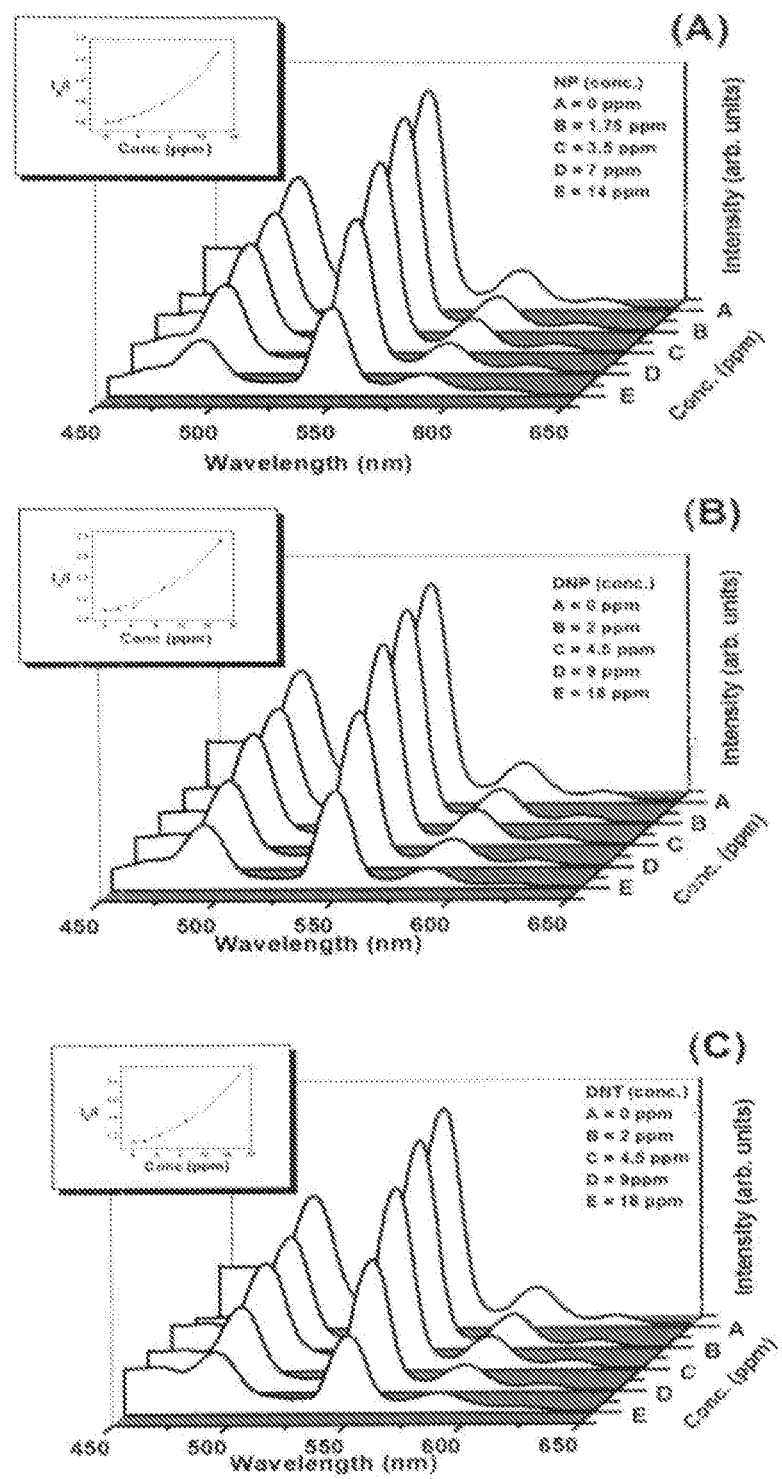
FIG. 6 depicts Emission spectra of $LaF_3:Tb^{3+}$@pABA nanoparticles at $\lambda_{ex}$=265 nm with the change in concentration of (a) NP, (b) DNP and (c) DNT. Inset shows their respective Stern-Volmer plots.
Figure 7:
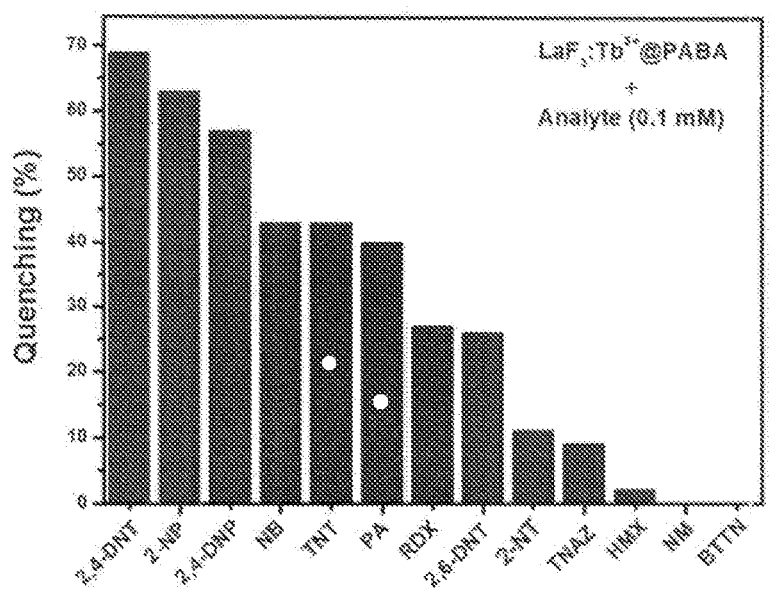
FIG. 7 depicts Bar graph showing the quenching efficiencies (%) for all the analyzed analyte at their fixed concentration of 0.1 mM.

To the aqueous dispersion of the pABA sensitized LaF$_3$:Tb$^{3+}$ nanoparticles, aqueous solution of o-nitrophenol (2-NP), was added and its photoluminescence property was studied. Photoluminescence spectra (FIG. 6) of LaF$_3$:Tb$^{3+}$@pABA in NP show that this nitro compound can quench the luminescence at very low concentrations of the analyte (2 ppm or 12.5 μM). Calculated values of quenching constant ($k_Q$), obtained for 2-NP is 1683M$^{-1}$ (FIG. 7).

Example 17

To the aqueous dispersion of the pABA sensitized LaF$_3$:Tb$^{3+}$ nanoparticles, aqueous solution of o-nitrotoluene(2-NT) was added and its photoluminescence property was studied.

Example 18

To the aqueous dispersion of the pABA sensitized LaF$_3$:Tb$^{3+}$ nanoparticles, aqueous solution of 2,4-dinitrotoluene (2,4-DNT) was added and its photoluminescence property was studied. Photoluminescence spectra (FIG. 6) of LaF$_3$:Tb$^{3+}$@pABA in 2,4-DNT show that this nitro compounds can quench the luminescence at very low concentrations of the analyte (2 ppm or 12.5 μM). Calculated values of quenching constant ($k_Q$), obtained for 2,4-DNT is 3296M$^{-1}$ (FIG. 7).

Example 19

To the aqueous dispersion of the pABA sensitized LaF$_3$:Tb$^{3+}$ nanoparticles, aqueous solution of 2,6-dinitrotoluene (2,6-DNT) was added and its photoluminescence property was studied.

Example 20

To the aqueous dispersion of the pABA sensitized LaF$_3$:Tb$^{3+}$ nanoparticles, aqueous solution of 2,4-dinitrophenol (2,4-DNP) was added and its photoluminescence property was studied. Photoluminescence spectra (FIG. 6) of LaF$_3$:Tb$^{3+}$@pABA in 2,4-DNP show that this nitro compounds can quench the luminescence at very low concentrations of the analyte (2 ppm or 12.5 μM). Calculated values of quenching constant ($k_Q$), obtained for 2,4-DNP is 2103M$^{-1}$ (FIG. 7).

Example 21

Figure 5:
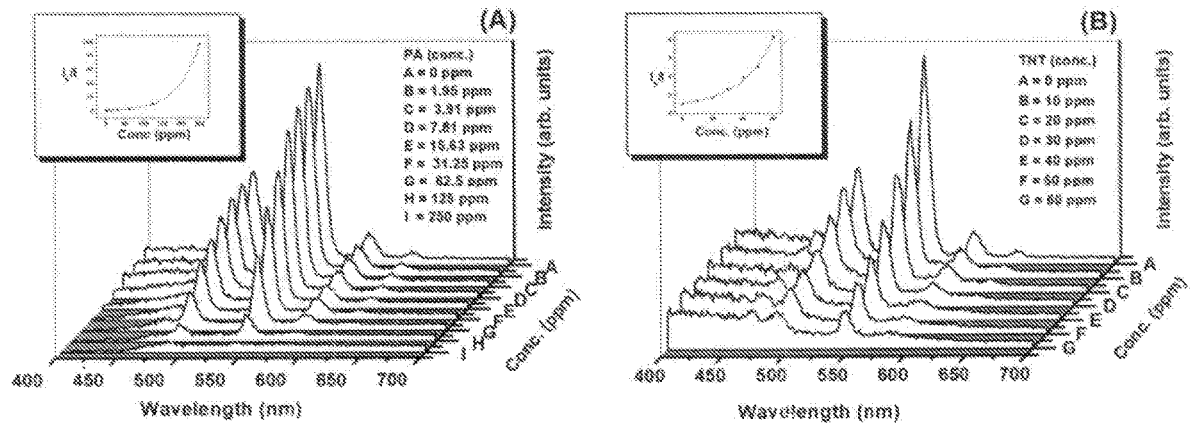
FIG. 5 depicts Emission spectra of $LaF_3:Tb^{3+}$@pABA nanoparticles at $\lambda_{ex}$=265 nm with the change in concentration of (a) PA and (b) TNT. Inset shows their respective Stern-Volmer plots.

To the aqueous dispersion of the pABA sensitized LaF$_3$:Tb$^{3+}$ nanoparticles, aqueous solution of picric acid (PA) was added and its photoluminescence property was studied. Luminescence quenching is observed at very low concentrations of picric acid (2.25 ppm or 10 μM) (FIG. 5). Calculated values of quenching constant ($k_Q$), obtained for PA is 5738 M$^{-1}$ (FIG. 7).

Example 22

To the aqueous dispersion of the pABA sensitized LaF$_3$:Tb$^{3+}$ nanoparticles, aqueous solution of 2,4,6-trinitrotoluene (TNT) was added and its photoluminescence property was studied. Luminescence quenching is observed at very low concentrations of TNT (10 ppm or 50 μM) (FIG. 5). Calculated values of quenching constant ($k_Q$), obtained for TNT is 12295 M$^{-1}$ (FIG. 7).

Example 23

To the aqueous dispersion of the pABA sensitized LaF$_3$:Tb$^{3+}$ nanoparticles, aqueous solution of nitromethane (NM) was added and its photoluminescence property was studied.

Example 24

To the aqueous dispersion of the pABA sensitized LaF$_3$:Tb$^{3+}$ nanoparticles, aqueous solution of 1,2,4-butanetriol nitrate (BTTN) was added and its photoluminescence property was studied.

Example 25

To the aqueous dispersion of the pABA sensitized LaF$_3$:Tb$^{3+}$ nanoparticles, aqueous solution of octahydro-1,3,5,7-tetranitro-1,3,5,7-tetrazocine (HMX) was added and its photoluminescence property was studied.

Example 26

To the aqueous dispersion of the pABA sensitized LaF$_3$:Tb$^{3+}$ nanoparticles, aqueous solution of 1,3,3-Trinitroazetidine(TNAZ) was added and its photoluminescence property was studied. FIG. 5 shows the photoluminescence spectra of LaF$_3$:Tb$^{3+}$@pABA in picric acid and T.N.T solution. Luminescence quenching is observed at very low concentrations of TNT (10 ppm or 50 μM) and picric acid (2.25 ppm or 10 μM). Photoluminescence spectra (FIG. 6) of LaF$_3$:Tb$^{3+}$@pABA in NP, 2,4-DNP and 2,4-DNT show that these nitro compounds can also quench the luminescence at very low concentrations of the analyte (2 ppm or 12.5 μM).

Figure 12:
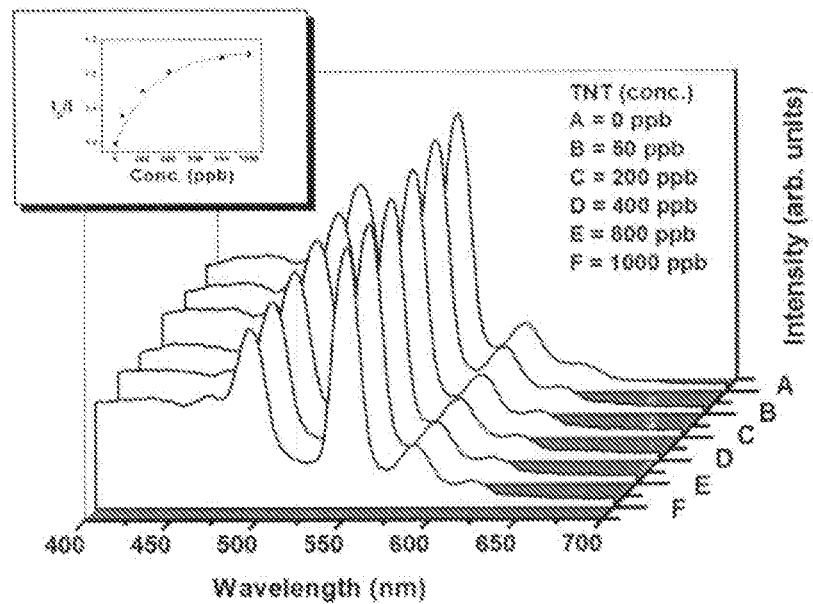
FIG. 12 depicts Emission spectra of LaF$_3$:Tb$^{3+}$@pABA nanoparticles at $\lambda_{ex}$=265 nm with the change in concentration of TNT (ppb level). Inset shows their respective Stern-Volmer plots.

FIG. 12 shows very sensitive detection of TNT at ppb level. At such low concentration the luminescence intensity change at $^5D_4$-$^7F_4$ is more clearly seen than for $^5D_4$-$^7F_5$ transition. The luminescence at 490 nm was used for Stern-Volmer plot. The surfaced functionalised nanomaterials were able to detect TNT upto 50 ppb.

Calculated values of quenching constant ($k_Q$), obtained using above Stern-Volmer equation for TNT, PA, 2-NP, 2,4-DNT, 2,4-DNP are 12295, 5738, 1683, 3296, 2103M$^{-1}$ respectively. Among the above analysed nitrocompounds, TNT has remarkably high quenching constant. A comparison of quenching efficiency of the all the selected nitrocompounds at a particular concentration (0.1 mM) is shown in the bar-graph of FIG. 7. It shows negligible quenching by aliphatic nitro explosives except for RDX (explained below). Thus the nanoparticles are highly sensitive as well as selective to the aromatic nitro compounds as compared with the aliphatic nitro compounds.

The order of quenching for the above analysed nitrocompounds was; 2,6-dinitrotoluene (2,6-DNT)>o-nitrophenol (2-NP)>2,4-dinitrophenol(2,4-DNP)>nitrobenzene(NB), 2,4,6-trinitrotoluene (TNT)>picric acid(PA)>1,3,5-trinitroperhydro-1,3,5-triazine (RDX)>2,6-dinitrotoluene (2,6-DNT)>>o-nitrotoluene (2-NT)>1,3,3-Trinitroazetidine (TNAZ)>octahydro-1,3,5,7-tetranitro-1,3,5,7-tetrazocine (HMX)>nitromethane (NM), 1,2,4-butanetriol nitrate (BTTN). (FIGS. 8 and 13) UV-absorption study as shown in the FIG. 8 reveals that emission spectra of pABA overlaps effectively with the UV absorption spectra of 2,4-DNT, 2-NP, 2,4-DNP and picric acid. This can explain high quenching performance of 2,4-DNT, 2-NP and 2,4-NP. There is a very less overlap for 2,6-DNT, TNT and RDX. So the quenching mechanism for 2,6-DNT and TNT is mainly electron transfer mechanism. This observation can also explain very low quenching performance by 2,6-DNT and RDX. Hence, pABA sensitised LaF$_3$:Tb$^{3+}$ NPs can be potential materials for using as a sensor for the detection of highly explosive nitrocompounds.

Example 27

Lifetime Measurements

Figure 14:
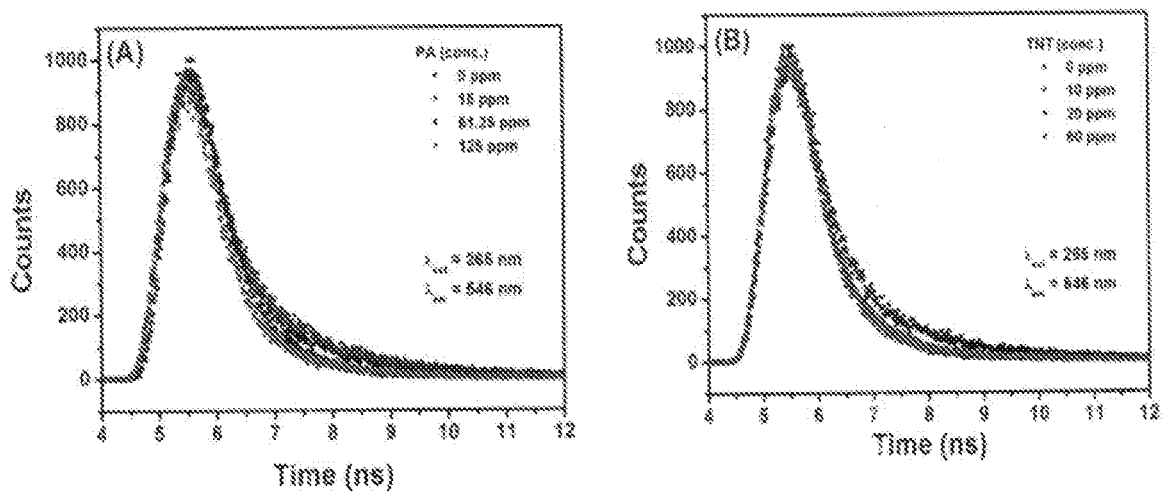
FIG. 14 depicts Decay profile for LaF$_3$:Tb$^{3+}$@pABA nanoparticles at varying concentration of (a) PA and (b) TNT.

Life time of the nanoparticles were studied in presence and absence of the analytes (PA and TNT) and were recorded by fixing the excitation and emission wavelengths at 265 nm and 546 nm respectively as shown in FIG. 14. Life time of the surface functionalized nanoparticles in absence of any analyte is 0.1177 ns. In presence of 18, 61.25 and 125 ppm picric acid life time values are 0.1158, 0.0883, and 0.0806 ns respectively. Life time values for 10, 20 and 60 ppm TNT are 0.0790, 0.0889, and 0.0785 ns respectively. (FIG. 15)

ADVANTAGES OF INVENTION

1. High detection level.
2. Method can detect nitro containing explosives.
3. It can be used for determining the pH of a solution.
4. Process of synthesis of Tb$^{3+}$ doped LaF$_3$ is simple and quick.

The invention claimed is:

1. A process for preparation of para aminobenzoic acid (pABA) sensitized terbium (Tb$^{3+}$) doped spherical LaF$_3$ nanoparticles and the said process comprising the steps of:
    i. mixing of lanthanum nitrate hexahydrate (La(NO$_3$)$_3$·6H$_2$O) and terbium nitrate pentahydrate (Tb(NO$_3$)$_3$·5H$_2$O) in the ratio ranging between 2 to 10 wt. %;
    ii. adding citric acid solution to the solution as obtained in step (i) at temperature in the range of 60-70° C.; followed by adding NH$_4$F to obtain the reaction mixture;
    iii. refluxing the reaction mixture at temperature in the range of 100 to 110° C. for period in the range of 100 to 120 minutes followed by cooling and drying at temperature in the range of 24-30° C. to obtain nanoparticles;
    iv. functionalizing the nanoparticles as obtained in step (iii) by dispersing in water followed by adding p-aminobenzoic acid solution at temperature in the range of 60 to 65° C. and refluxing for period in the range of 100 to 120 minutes at temperature in the range of 70 to 75° C. to obtain surface-functionalized nanoparticles.

2. Para aminobenzoic acid (pABA) sensitized terbium (Tb$^{3+}$) doped spherical LaF$_3$ nanoparticles prepared by the process as claimed in claim 1, wherein sensitization is attained using pABA to terbium (MI doped spherical LaF$_3$ nanoparticles in a weight ratio of 1:1;
    wherein the nanoparticles are useful for detection of nitro group containing compounds; and
    wherein the detection level of the nitro compounds in the range of 0.04 to 10 ppm.

3. The nanoparticles as claimed in claim 2, wherein the nitro group containing compounds are aromatic or aliphatic compounds.

4. The nanoparticles as claimed in claim 2, wherein the nitro group containing compounds are nitrobenzene(NB), o-nitrophenol(2-NP), o-nitrotoluene(2-NT), 2,4-dinitrotoluene (2,4-DNT), 2,6-dinitrotoluene (2,6-DNT), 2,4-dinitrophenol(2,4-DNP), picric acid(PA) and 2,4,6-trinitrotoluene (TNT), nitromethane (NM), 1,2,4-butanetriol nitrate (BTTN), octahydro-1,3,5,7-tetranitro-1,3,5,7-tetrazocine (HMX), and 1,3,3-Trinitroazetidine (TNAZ).

5. The nanoparticles as claimed in claim 2, wherein said nanoparticles shows 100-120 times enhancement in the luminescence intensity in comparison to direct excitation of Tb$^{3+}$ ion.

6. The nanoparticles as claimed in claim 2, wherein said nanoparticles are used for detection of pH acidic or alkaline solution and said nano particles possess UV-absorption peak at 265 at pH=3.

7. The nanoparticles as claimed in claim 2, wherein the life time value of the surface functionalized nanoparticles in absence of an analyte is 0.1177 ns and in presence of picric acid analyte in the concentration of 18, 61.25 and 125 ppm are 0.1158, 0.0883, and 0.0806 ns respectively.

* * * * *